US008362892B2

(12) United States Patent
Kuenzner

(10) Patent No.: US 8,362,892 B2
(45) Date of Patent: Jan. 29, 2013

(54) INFORMATION SYSTEM

(75) Inventor: Hermann Kuenzner, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 731 days.

(21) Appl. No.: 12/608,331

(22) Filed: Oct. 29, 2009

(65) Prior Publication Data

US 2010/0109856 A1 May 6, 2010

(30) Foreign Application Priority Data

Oct. 30, 2008 (DE) ........................ 10 2008 054 008

(51) Int. Cl.
*B60Q 1/00* (2006.01)

(52) U.S. Cl. ..................... 340/439; 340/425.5; 340/438; 340/441; 340/450.2

(58) Field of Classification Search .................. 340/439, 340/425.5, 438, 441, 450.2; 180/65.1, 65.2
See application file for complete search history.

(56) References Cited

U.S. PATENT DOCUMENTS

| | | | | |
|---|---|---|---|---|
| 4,663,713 | A * | 5/1987 | Cornell et al. | 701/52 |
| 5,201,889 | A * | 4/1993 | Mason | 477/43 |
| 5,939,794 | A * | 8/1999 | Sakai et al. | 290/40 A |
| 6,793,027 | B1 * | 9/2004 | Yamada et al. | 180/65.1 |
| 2011/0251744 | A1 * | 10/2011 | Amano et al. | 701/22 |

* cited by examiner

*Primary Examiner* — Daryl Pope
(74) *Attorney, Agent, or Firm* — Crowell & Moring LLP

(57) ABSTRACT

An information system is provided for displaying a residual range of a motor vehicle, and includes devices for determining the filling degree of a power storage device of the motor vehicle, a computing unit for determining the residual range, and a display unit for displaying the residual range, by way of the filling degree of the power storage device. A first estimated value concerning a maximal residual range of the motor vehicle can be determined. A power consumption of at least one additional consuming device of the motor vehicle can be determined and, while the power consumption of the at least one additional consuming device is taken into account, a second estimated value can be determined concerning a reduced residual range of the motor vehicle. The first estimated value can be displayed by the display device simultaneously with the second estimated value and/or a difference between the first and the second estimated values can be displayed simultaneously with at least one of the two estimated values.

20 Claims, 2 Drawing Sheets

INFORMATION SYSTEM

CROSS-REFERENCE TO RELATED APPLICATION

This application claims priority under 35 U.S.C. §119 to German Patent Application No. DE 10 2008 054 008.0, filed Oct. 30, 2008, the entire disclosure of which is herein expressly incorporated by reference.

BACKGROUND AND SUMMARY OF THE INVENTION

The invention relates to an information system for a motor vehicle.

As a rule, modern motor vehicles have information systems for indicating a residual range of the motor vehicle, which information systems have devices for determining the filling degree of a power storage device of the motor vehicle, a computing device for determining the residual range and an indicating device for indicating the residual range. Such information systems are known for motor vehicles having internal-combustion engines as well as for electric and hybrid vehicles. For determining the filling degree of the respective power storage device, the filling degree of a fuel tank is measured in the case of motor vehicles having internal-combustion engines; in the case of electric vehicles, the state of charge of a battery is measured. In the case of hybrid vehicles, the filling degree of both power storage devices can be used for determining the residual range. In addition to the direct indication of the filling degree of the power storage device, the numerical display of a residual range in miles or kilometers is also widespread nowadays. Instructions with respect to increasing the residual range, as a rule, are not provided in the case of such information systems.

Among other approaches, it is known to emit gear shifting recommendations to the driver for increasing the residual range. The providing of a power saving mode is also known from literature as another device for increasing the residual range, which mode provides the switching-off or the restricted operation of not absolutely necessary additional consuming or load devices.

It is an object of the invention to provide improved assistance to the driver of a motor vehicle with respect to increasing the residual range of the motor vehicle.

This object is achieved by an information system for displaying a residual range of a motor vehicle, having devices for determining the filling degree of a power storage device of the motor vehicle, a computing unit for determining the residual range and a display unit for displaying the residual range. By way of the filling degree of the power storage device, a first estimated value concerning a maximal residual range of the motor vehicle can be determined. A power consumption of at least one additional consuming device of the motor vehicle can be determined. While the power consumption of the at least one additional consuming device is taken into account, a second estimated value can be determined concerning a reduced residual range of the motor vehicle. The first estimated value can be displayed by the display device simultaneously with the second estimated value and/or a difference between the first and the second estimated value can be displayed simultaneously with at least one of the two estimated values. Advantageous embodiments and further developments of the invention are described herein.

According to the invention, the information system and the computing unit contained therein respectively is further developed such that a first estimated value concerning a maximal residual range of the motor vehicle can be determined by way of the filling degree of the power storage device. This can take place in a manner known per se, for example, by way of the filling degree and a hypothetical—for example, historically determined or manufacturer-indicated—total power consumption while additional consuming devices of the motor vehicle are completely and/or largely switched off. Furthermore, the information system has devices for determining the power consumption of at least one additional consuming device (such as an air conditioner or a seat heater) of the motor vehicle. The determination of the power consumption can be based on an estimate or a measurement. In addition, the information system and the computing unit contained therein respectively is equipped such that, while taking into account the power consumption of the at least one additional consuming device, a second estimated value can be determined concerning a reduced residual range of the motor vehicle. This can also take place in a manner known per se, for example, by way of the filling degree and the actual total power consumption when the additional consuming device is switched on. By way of the display device, the first estimated value can finally be displayed simultaneously with the second estimated value and/or the difference between the first and the second estimated value can be displayed simultaneously with at least one of the two estimated values.

If necessary, the first estimated value can even be displayed simultaneously with the second estimated value and the difference between the first and the second estimated value. This results in a particularly simple and rapidly readable overall display.

By use of the information system, it is explained to the observer of the display in which manner and to what extent the power consumption of the additional consuming device influences the residual range of the vehicle. Particularly in the case of vehicles with a relatively small maximal range (for example, most currently available electric vehicles, or electric vehicles in the development stage), exact and detailed information concerning the residual range of the vehicle offers considerable advantages. The information system sufficiently informs the driver in order for the driver to make a sound decision as to whether or not he wants to do without a utilization of one or more additional consuming devices in favor of an increased residual range.

According to a preferred embodiment of the present invention, the respective power consumption of several, i.e. at least two additional consuming devices of the motor vehicle can be determined, and contributions or shares of several, i.e., the at least two additional consuming devices, are determined by the difference between the first and the second estimated value and are displayed. Supplied with such information, the driver can make another sound decision as to whether or not he wants to do without the utilization of one or more additional consuming devices in favor of an increased residual range. Specifically, the display indicates the effect of the elimination of the power consumption of a certain additional consuming device and/or the relationship of the power consumption of a certain additional consuming device to that of another consuming device. Thus, the driver can, for example, intentionally leave an additional consuming device with a relatively low power consumption in an active condition while he deactivates an additional consuming device with a relatively high power consumption because the operation of the latter has a more severe effect on the residual range.

According to a preferred embodiment of the present invention, the first and the second estimated values are determined first. A conclusion can then easily be drawn from the first and second estimated values concerning the reduction of the range as a result of the additional consuming device because this reduction consists of precisely the difference between the first and second estimated values.

As an alternative, only one of the estimated values may be determined directly, and a conclusion may be drawn concerning the respective other estimated value by means of empirical values about the increase/decrease of the residual range as a result of certain additional consuming devices which may, for example, be stored in a table of the computing unit in the vehicle.

An air conditioner, a rear window heater, a windshield heater, a seat heater and an audio system are examples of suitable additional consuming devices for which—either individually or jointly—a power consumption or a residual range decrease resulting from this power consumption can advantageously be displayed in the suggested manner.

If the information system is basically only capable of taking into account a single additional consuming device, the latter will preferably currently be taken into account in the emitted display only if it is also currently activated.

If the information system is basically capable of taking into account several additional consuming devices, these are preferably each actually taken into account in the emitted display only when they are activated. Thus, an air conditioner and a seat heat can basically be taken into account, but if only the air conditioner is activated, the display values (first/second estimated value, difference) to be determined will be determined only by way of the power consumption of the air conditioner.

The information system preferably takes into account the currently activated additional consuming device only with respect to the power consumption which is the result of its current setting and/or of the current ambient conditions (for example, the outside temperature). For example, a seat heater can normally be operated in different stages of intensity. The power consumption and the resulting residual range reduction is naturally less in a low stage of intensity than in a higher stage of intensity.

When the switch-on condition and/or operating condition of an additional consuming device is changed, the display will preferably follow immediately or at least almost immediately.

According to a preferred embodiment of the present invention, the difference between the first and the second estimated value can be illustrated in a graphic residual range representation, particularly in a bar representation or a pie chart, as part of the first estimated value. Such a graphic representation can particularly clearly illustrate the influence of the operation of additional consuming devices upon the residual range.

The graphic residual range representation may in each case include a numerical representation of the first and of the second estimated value. In this manner, the driver is informed especially concerning the maximally possible residual range and the residual range to currently be expected. The numerical representation may particularly include the respective value in kilometers or miles. It could also be represented by residual drive time based on the operating state of the vehicle.

The graphic residual range representation may also in each case include a numerical representation of the first estimated value and of the difference. In particular, the driver is thereby informed concerning the maximally possible residual range and the reduction of the latter to be currently expected as a result of the operation of additional consuming devices.

The graphic residual range representation may in each case also include a numerical representation of the second estimated value and of the difference. In particular, the driver is thereby informed concerning the residual range to be currently expected and the potential for increasing the latter by switching off additional consuming devices.

The graphic residual range representation may also in each case include a numerical representation of the first and of the second estimated value. In a particularly simple and rapidly readable manner, the driver is thereby informed of the maximally possible residual range and of the residual range to be currently expected as well as of the influence of the operation of additional consuming devices on the residual range.

According to a particularly preferred embodiment of the present invention, the graphic residual range representation is constructed as a bar representation. For displaying the first estimated value, it may then particularly comprise a bar composed of a first partial bar for displaying the second estimated value and a second partial bar for displaying the difference. This results in a particularly space-saving and easily readable display of the above-mentioned values.

A type of display is particularly advantageous in which, in the event of the operation of several additional consuming devices, the shares of the individual additional consuming devices in the difference or residual range reduction are again displayed as segments of the second partial bar.

The difference between the first and the second estimated value can preferably be displayed together with an identifier or label for the at least one additional consuming device. The second partial bar may, for example, to an extent, be labeled by such an identifier. The identifier may be designed as text (written out or abbreviated, for example, "SHZ" ("SH") for a seat heater or "HSH" ("RWH") for a rear window heater or as a symbol (for example, ice crystal for an air conditioner). The identifier clearly indicates the additional consuming device whose operation results in the residual range reduction visible in the display. If the residual range reduction is a result of the operation of several additional consuming devices, the identifiers of all these additional consuming devices may be displayed. However, advantageously only identifiers of those additional consuming devices may be displayed which have a certain minimum share in the residual range reduction.

As an alternative, only an identifier of that additional consuming device may be displayed that has the largest share in the residual range reduction. The labeling with the identifier or identifiers is particularly space-saving and easily assignable when it is arranged completely within the contours of the second partial bar. For an easily readable display, the second partial bar is preferably set off by color against the first partial bar.

Other objects, advantages and novel features of the present invention will become apparent from the following detailed description of one or more preferred embodiments when considered in conjunction with the accompanying drawings.

DETAILED DESCRIPTION OF THE DRAWINGS

An electric vehicle has an information system for displaying its residual range. The filling degree of the battery, with which the vehicle is equipped, can be determined for the purpose of the display. Furthermore, the power consumption of several additional consuming devices (here, the air conditioner and the seat heater) of the motor vehicle as well as their switch-on condition can be determined and taken into account.

By means of a computing unit of the information system, the residual range can be determined in the manner described in the following on the basis of the state of charge of the battery and of the power consumption values of the additional consuming devices and can be displayed on a display unit of the vehicle.

First, a first estimated value concerning a maximal residual range of the motor vehicle is determined by way of the state of charge of the battery.

For determining this maximal residual range, it is assumed that the seat heater and the air conditioner, i.e. all additional consuming devices that can be taken into account within the present concept, are switched off during the residual drive. The determination of this maximal residual range is essentially based on a division of the available amount of power by the route consumption of the vehicle when the additional consuming devices are switched off.

If at least one of the above-mentioned additional consuming devices is activated, a second estimated value concerning a reduced residual range of the motor vehicle is determined by taking into account the power consumption of this additional consuming device. If, for example, the air conditioner is activated but not the seat heater, it is assumed for the determination of this reduced residual range that this condition (seat heater OFF, air conditioner ON) is maintained during the residual drive. The second estimated value therefore depends on the switch-off condition of the additional consuming devices.

Figure 1:
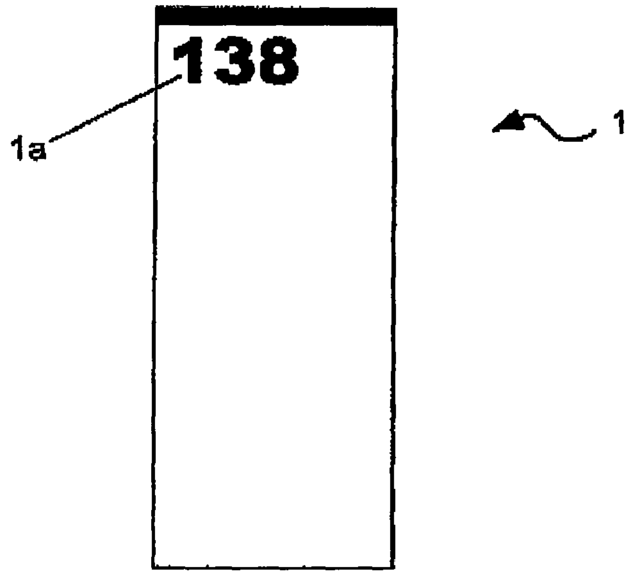
FIG. 1 is a view of a first display condition of a display unit for displaying the residual range of a motor vehicle.

FIG. 1 illustrates the resulting display of the display unit in a display condition, in which the seat heater, as well as the air conditioner, are deactivated. The second estimated value (reduced residual range)—because it is in this case equal to the first estimated value (maximal residual range)—does not have to be computed and displayed separately. Only the first estimated value is displayed—specifically in a bar representation with a bar 1 whose height is proportional to the maximal residual range and which includes a numerical representation 1*a* of the first estimated value (here "138" representing 138 kilometers).

Figure 2:
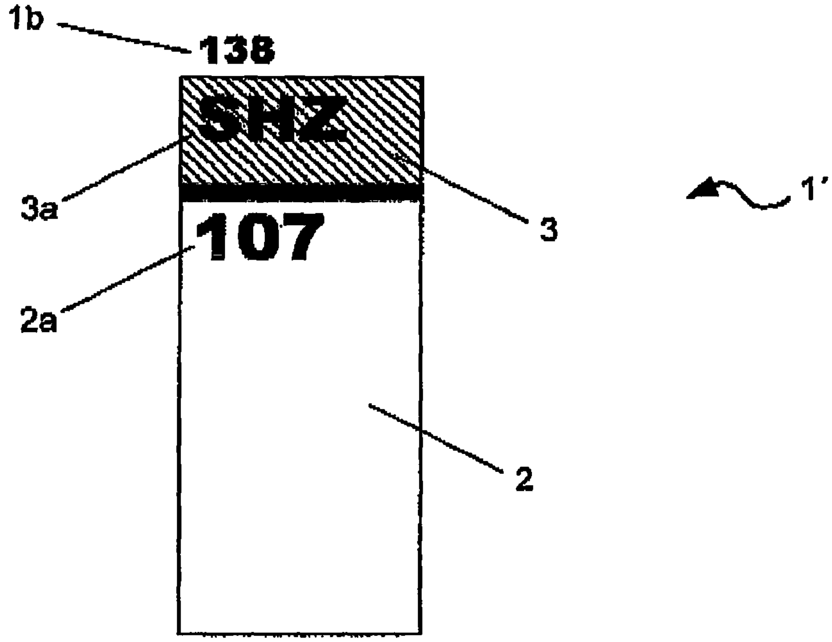
FIG. 2 is a view of a second display condition of the same display unit.

FIG. 2 illustrates the resulting display of the display unit in a display condition in which the seat heater is activated and the air conditioner is deactivated. The second estimated value will now be determined by way of the route consumption of the vehicle increased by the seat heater.

The first estimated value (maximal residual range) is displayed in a bar representation with a bar 1' whose height is proportional to the maximal residual range. Above the bar, a numerical representation 1*b* of the first estimated value (here "138" representing 138 kilometers) is situated. According to FIG. 2, the bar 1' is divided into a partial bar 2 for displaying the second estimated value (reduced residual range) and a partial bar 3 for displaying the difference between the first and the second estimated values, i.e. the residual range reduction as a result of the additional consuming device. The partial bar 2 contains a numerical representation 2*a* of the second estimated value (here "107" representing 107 kilometers).

For labeling the partial bar, the partial bar 3 contains an identifier 3*a* of the additional consuming device (here "SHZ" representing the additional consuming device "seat heater") responsible for this partial bar (or the residual range reduction illustrated by it). In this case, the estimated value of the residual range reduction (here, 138 km−107 km=31 km) is not displayed numerically but only graphically. Other types of implementation of the introduced display concept may naturally also include the numerical display of the difference value.

Figure 3:
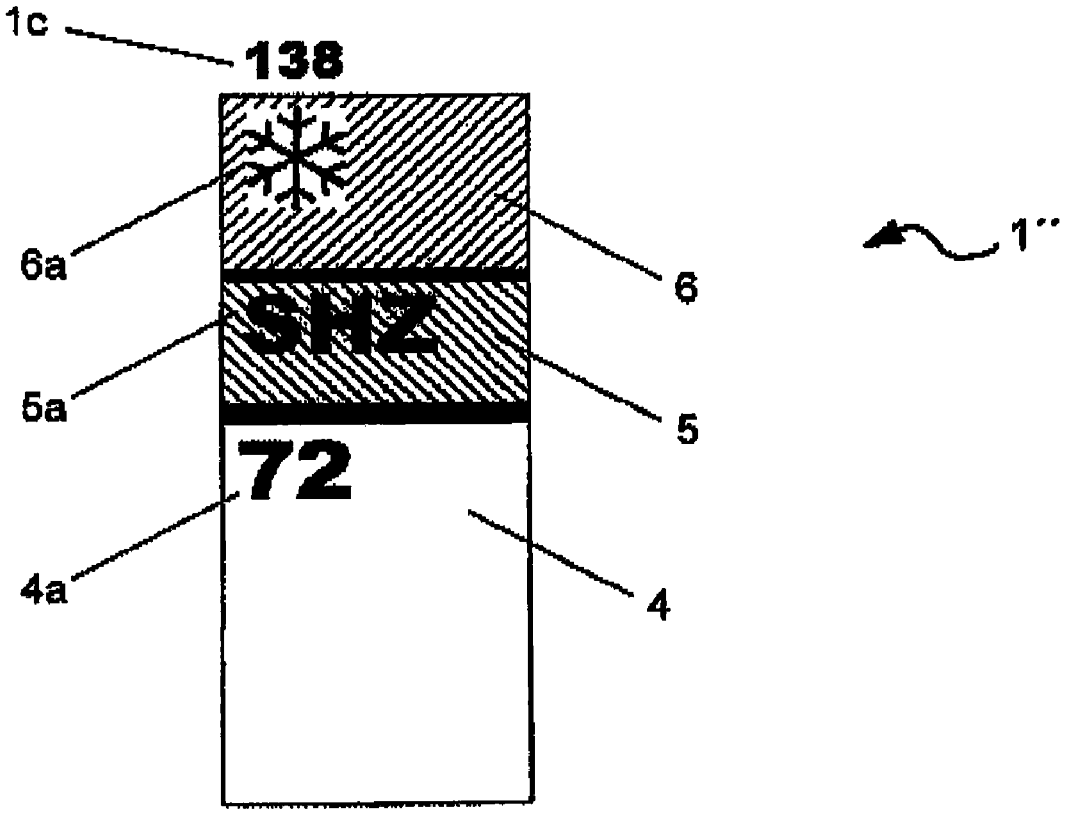
FIG. 3 is a view of a third display condition of the same display unit.

FIG. 3 illustrates the resulting display of the display unit in a display condition in which both the seat heater and the air conditioner are activated. The second estimated value is now determined by way of the route consumption of the vehicle increased by the seat heater and the air conditioner.

The first estimated value (maximal residual range) is displayed again in a bar representation with a bar 1" whose height is proportional to the maximal residual range. A numerical representation 1*c* of the first estimated value (here "138" representing 138 kilometers) is again situated above the bar. According to FIG. 3, the bar 1" is divided into a partial bar 4 for displaying the second estimated value and two partial bars 5 and 6 for displaying the difference between the first and the second estimated value.

The partial bar 4 contains a numerical representation 4*a* of the second estimated value (here, "72" representing 72 kilometers). The partial bars 5 and 6 together show the residual range reduction resulting from the operation of the additional consuming devices. In this case, partial bar 5 shows the share of the seat heater and partial bar 6 shows the share of the air conditioner.

For labeling the partial bar 5, the partial bar 5 contains an identifier 5*a* of the additional consuming device (here "SHZ" representing the additional consuming device "seat heater") responsible for this partial bar. The partial bar 5 according to FIG. 3 has the same color as the partial bar 3 according to FIG. 2, whereby the viewer can also easily assign it to the additional consuming device "seat heater". For labeling the partial bar 6, the partial bar 6 contains an identifier 6*a* of the additional consuming device (here, an "ice crystal" representing the additional consuming device "air conditioner") responsible for this partial bar. In this case, the estimated value of the residual range reduction (here, 138 km−72 km=66 km) is not displayed numerically but only graphically. Other types of implementation of the introduced display concept may naturally also include the numerical display of the difference value or of the individual shares of the additional consuming devices.

When the switch-on condition of one of the additional consuming devices is changed, the display will follow immediately (for example, transition from the display condition according to FIG. 3 to the display condition according to FIG. 2 when the air conditioner is switched off). The display will also immediately follow a significant change of the power consumption of one of the additional consuming devices. For example, starting from the display condition according to FIG. 3, an adjustment of the seat heater to a lower power stage will lead to a "melting" or size reduction of the partial bar 5 and to a corresponding increasing of the partial bar 4 as well as of the second estimated value 4*a*.

By means of the differentiated offer of information by the introduced information system, the driver of the vehicle will obtain an overview—although "only" by means of estimates—of the consequences of the operation of additional consuming devices with respect to the residual range of the vehicle. By switching off one of several additional consuming devices and the then immediately changed display (for example, switching-off of the air conditioner and thereby the transition from the display condition according to FIG. 3 to the display condition according to FIG. 2), he can also rapidly and easily check whether the residual range after the switch-off is sufficient for reaching an endeavored destination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An information system for displaying a residual range of a motor vehicle, comprising:

a filling degree device for determining a filling degree of a power storage device of the motor vehicle;

a computing unit for determining the residual range;

wherein a first estimated value indicative of a maximal residual range of the motor vehicle is determined by way of the filling degree device;

wherein a second estimated value indicative of a reduced residual range of the motor vehicle is determined as a function of a power consumption of at least one additional consuming device of the motor vehicle; and a display unit operatively configured to display at least one of:

the first estimated value simultaneously with the second estimated value; and a difference between the first estimated value and the second estimated value simultaneously with at least one of the first and second estimated values.

2. The information system according to claim 1, wherein the display device displays the first estimated value simultaneously with the second estimated value and the difference between the first and the second estimated values.

3. The information system according to claim 1, wherein the display device displays the difference between the first and the second estimated values in a graphic residual range representation as part of the first estimated value.

4. The information system according to claim 3, wherein the graphic residual range representation is one of a bar graph representation and a pie graph representation.

5. The information system according to claim 3, wherein the graphic residual range representation comprises at least one of:

a numerical representation of the first estimated value and the second estimated value;

a numerical representation of the first estimated value and of the difference between the first and the second estimated values; and a numerical representation of the second estimated value and of the difference between the first and the second estimated values.

6. The information system according to claim 3, wherein the graphic residual range representation comprises a numerical representation of the first estimated value and the second estimated value and of the difference between the first and the second estimated values.

7. The information system according to claim 1, wherein the difference between the first and the second estimated values is displayed only when an additional consuming device is switched-on.

8. The information system according to claim 3, wherein the graphic residual range representation is a bar representation that comprises:

a bar for displaying the first estimated value, said bar including a first partial bar for displaying the second estimated value and a second partial bar for displaying the difference between the first and the second estimated values.

9. The information system according to claim 1, wherein the difference between the first and the second estimated values is displayable together with an identifier for the at least one additional consuming device of the motor vehicle.

10. The information system according to claim 8, wherein the second partial bar is labeled with an identifier for the at least one additional consuming device.

11. The information system according to claim 10, wherein the label is arranged completely within a contour of the second partial bar.

12. The information system according to claim 8, wherein the second partial bar is visually set-off with respect to the first partial bar by way of color.

13. The information system according to claim 1, wherein a respective power consumption of at least two additional consuming devices of the motor vehicle are determined; and wherein contributions of the at least two additional consuming devices are determined by the difference between the first and the second estimated values, which contributions are displayed on the display unit.

14. A method for displaying residual range information concerning a motor vehicle, the method comprising the acts of:

determining a first estimated value indicative of a maximal residual range of the motor vehicle as a function of a filling degree of a power storage device of the motor vehicle;

determining a power consumption of at least one additional consuming device of the motor vehicle;

determining a second estimated value indicative of a reduced residual range of the motor vehicle by taking into account the power consumption of the at least one additional consuming device; and displaying on a display unit the first estimated value simultaneously with the second estimated value.

15. The method according to claim 14, further comprising the act of:

displaying a difference between the first estimated value and the second estimated value simultaneously with at least one of the two estimated values.

16. The method according to claim 14, further comprising the act of:

displaying the first estimated value simultaneously with the second estimated value in a bar graph.

17. The method according to claim 16, wherein the bar graph further indicates a difference between the first and the second estimated values.

18. The method according to claim 17, wherein the bar graph includes numerical representations of at least one of the first estimated value, the second estimated value, and a difference between the first and the second estimated values.

19. The method according to claim 14, wherein the displaying act further comprises the act of displaying the first estimated value and the second estimated value, together with a difference between the first and the second estimated values, in a bar representation, wherein the difference between the first and the second estimated values includes an identifier of the at least one additional consuming device.

20. A display for a motor vehicle, comprising:

a display unit having a display screen; and wherein a first estimated value indicative of a maximum residual range of the motor vehicle is displayed on the display screen simultaneously with at least one of:

a second estimated value indicative of a reduced residual range of the motor vehicle based upon power consumption of an additional consuming device of the motor vehicle, and a difference between the first estimated value and the second estimated value.

* * * * *